US011935694B2

(12) United States Patent
Inoue et al.

(10) Patent No.: US 11,935,694 B2
(45) Date of Patent: Mar. 19, 2024

(54) SUPERCONDUCTING COIL AND METHOD OF MANUFACTURING THE SAME

(71) Applicant: Mitsubishi Electric Corporation, Tokyo (JP)

(72) Inventors: Tatsuya Inoue, Tokyo (JP); Hiroyuki Horii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 261 days.

(21) Appl. No.: 17/604,462

(22) PCT Filed: May 20, 2019

(86) PCT No.: PCT/JP2019/019902
§ 371 (c)(1),
(2) Date: Oct. 18, 2021

(87) PCT Pub. No.: WO2020/234960
PCT Pub. Date: Nov. 26, 2020

(65) Prior Publication Data
US 2022/0215993 A1 Jul. 7, 2022

(51) Int. Cl.
*H01F 6/06* (2006.01)
*H01F 6/04* (2006.01)
*H01F 41/04* (2006.01)

(52) U.S. Cl.
CPC .............. *H01F 6/06* (2013.01); *H01F 6/04* (2013.01); *H01F 41/048* (2013.01)

(58) Field of Classification Search
CPC ............. H01F 6/06; H01F 6/04; H01F 41/048
See application file for complete search history.

(56) References Cited

U.S. PATENT DOCUMENTS

| 4,467,303 A | 8/1984 | Laskaris |
| 4,896,128 A | 1/1990 | Wollan et al. |

(Continued)

FOREIGN PATENT DOCUMENTS

| JP | S59175710 A | 10/1984 |
| JP | H02211608 A | 8/1990 |

(Continued)

OTHER PUBLICATIONS

International Search Report (PCT/ISA/210) with translation and Written Opinion (PCT/ISA/237) dated Jul. 30, 2019, by the Japanese Patent Office as the International Searching Authority for International Application No. PCT/JP2019/019902. (9 pages).

*Primary Examiner* — Mohamad A Musleh
(74) *Attorney, Agent, or Firm* — BUCHANAN INGERSOLL & ROONEY PC

(57) ABSTRACT

In a step of inserting each of a plurality of disk-shaped windings into a recessed groove portion of a corresponding one of a plurality of ring-shaped fixing portions, each of the plurality of disk-shaped windings is inserted in a state where an outer circumferential surface of each of the plurality of disk-shaped windings is spaced apart from a bottom surface of the recessed groove portion of a corresponding one of the plurality of ring-shaped fixing portions. In a step of bringing the outer circumferential surface of each of the plurality of disk-shaped windings into direct or indirect contact with the bottom surface of the recessed groove portion of the corresponding one of the plurality of ring-shaped fixing portions, each of the plurality of disk-shaped windings and an outer frame portion are cooled and contracted for contact.

11 Claims, 6 Drawing Sheets

(56) References Cited

U.S. PATENT DOCUMENTS

| | | | | |
|---|---|---|---|---|
| 5,525,583 A | * | 6/1996 | Aized | H01F 41/079 505/879 |
| 2012/0068804 A1 | * | 3/2012 | Dunckley | H01F 6/06 29/605 |
| 2012/0214674 A1 | | 8/2012 | Blakes et al. | |
| 2015/0234018 A1 | * | 8/2015 | Watanabe | G01R 33/385 324/318 |
| 2017/0117076 A1 | | 4/2017 | Miyazoe et al. | |

FOREIGN PATENT DOCUMENTS

| | | | |
|---|---|---|---|
| JP | 2012114230 A | * | 6/2012 |
| JP | 2012175110 A | | 9/2012 |

\* cited by examiner

SUPERCONDUCTING COIL AND METHOD OF MANUFACTURING THE SAME

TECHNICAL FIELD

The present invention relates to a superconducting coil and a method of manufacturing the superconducting coil.

BACKGROUND ART

Japanese Patent Laying-Open No. 02-211608 (PTL 1) discloses a support structure for a superconducting coil. The support structure for a superconducting coil disclosed in PTL 1 is configured as a magnetic support structure for a set of magnet coils made of a solenoid magnet. The support structure includes a set of support rings, attachment means, and a plurality of sets of support pillars. The set of support rings include at least two support rings that are spaced apart from each other along an axis of a through hole of a magnet. Each of the support rings is disposed coaxially with the axis of the through hole of the magnet. Through the attachment means, at least one magnet coil of the set of magnet coils is attached to the inside of each support ring of the set of support rings to be coaxial with the axis of the through hole of the magnet.

The above-mentioned support structure for a superconducting coil receives each magnet coil on a radially inner surface of a support ring located at one end. The radially inner surface has a diameter sized such that a magnet coil can be readily inserted into the support ring at one end when this support ring at one end and the magnet coil are at a room temperature. When the magnet coil and the support ring at one end are cooled to a superconducting temperature, the expansion coefficient of aluminum in the support ring at one end is greater than the expansion coefficients of epoxy and the wire of the magnet coil, so that the magnet coil is compressed and securely held by the support ring at one end. The compressive stress generated by the support ring at one end helps the coil to withstand large hoop stress caused by the self-repulsive force occurring inside the magnet coil when it is excited.

CITATION LIST

Patent Literature

PTL 1: Japanese Patent Laying-Open No. 02-211608

SUMMARY OF INVENTION

Technical Problem

According to the superconducting coil disclosed in PTL 1, when the superconducting coil is cooled, an outer frame portion having a coefficient of thermal expansion higher than that of a disk-shaped winding is greatly contracted, so that the outer frame portion holds the disk-shaped winding. When the superconducting coil is cooled, however, the pressure from the contracted outer frame portion causes thermal stress in the disk-shaped winding. This thermal stress may deform the disk-shaped winding, thereby damaging the superconducting coil.

The present invention has been made in light of the above-described problems, and aims to provide a method of manufacturing a superconducting coil, by which damage caused by deformation of a disk-shaped winding can be suppressed.

Solution to Problem

A method of manufacturing a superconducting coil according to the present invention includes: winding a superconducting wire around a rod-shaped jig to form a plurality of disk-shaped windings to be coaxially arranged; removing the rod-shaped jig from the disk-shaped windings; measuring a distance from a winding central axis to an outer circumferential surface of each of the disk-shaped windings, the winding central axis being a central axis of an inner circumferential surface of each of the disk-shaped windings; forming an outer frame portion including a plurality of ring-shaped fixing portions that each have a recessed groove portion extending in a circumferential direction on an inner circumferential side, the ring-shaped fixing portions being coaxially arranged; measuring a shape of a bottom surface of the recessed groove portion of each of the ring-shaped fixing portions; aligning a central axis of an entirety of the ring-shaped fixing portions based on measurement of the shape of the bottom surface; inserting each of the disk-shaped windings into the recessed groove portion of a corresponding one of the ring-shaped fixing portions; fixing the disk-shaped windings in a direction along the winding central axis; and bringing the outer circumferential surface of each of the disk-shaped windings into direct or indirect contact with the bottom surface of the recessed groove portion of the corresponding one of the ring-shaped fixing portions. In inserting each of the disk-shaped windings into the recessed groove portion of a corresponding one of the ring-shaped fixing portions, each of the disk-shaped windings is inserted in a state where the outer circumferential surface of each of the disk-shaped windings is spaced apart from the bottom surface of the recessed groove portion of the corresponding one of the ring-shaped fixing portions, based on: a result of measurement of a distance from the winding central axis to the outer circumferential surface of each of the disk-shaped windings; and a result of alignment of the central axis of the entirety of the ring-shaped fixing portions. In fixing the disk-shaped windings in a direction along the winding central axis, the disk-shaped windings are fixed by disposing a first adjustment member between one side surface of the recessed groove portion of each of the ring-shaped fixing portions and a corresponding one of the disk-shaped windings. In bringing the outer circumferential surface of each of the disk-shaped windings into direct or indirect contact with the bottom surface of the recessed groove portion of the corresponding one of the ring-shaped fixing portions, contact is made by cooling and contracting each of the disk-shaped windings and the outer frame portion.

Advantageous Effects of Invention

The present invention can reduce the thermal stress generated in each of the plurality of disk-shaped windings by pressure received from each of the plurality of ring-shaped fixing portions when the outer frame portion including the plurality of ring-shaped fixing portions is cooled and contracted. This can suppress damage to the superconducting coil caused by deformation of the plurality of disk-shaped windings.

DESCRIPTION OF EMBODIMENTS

Figure 1:
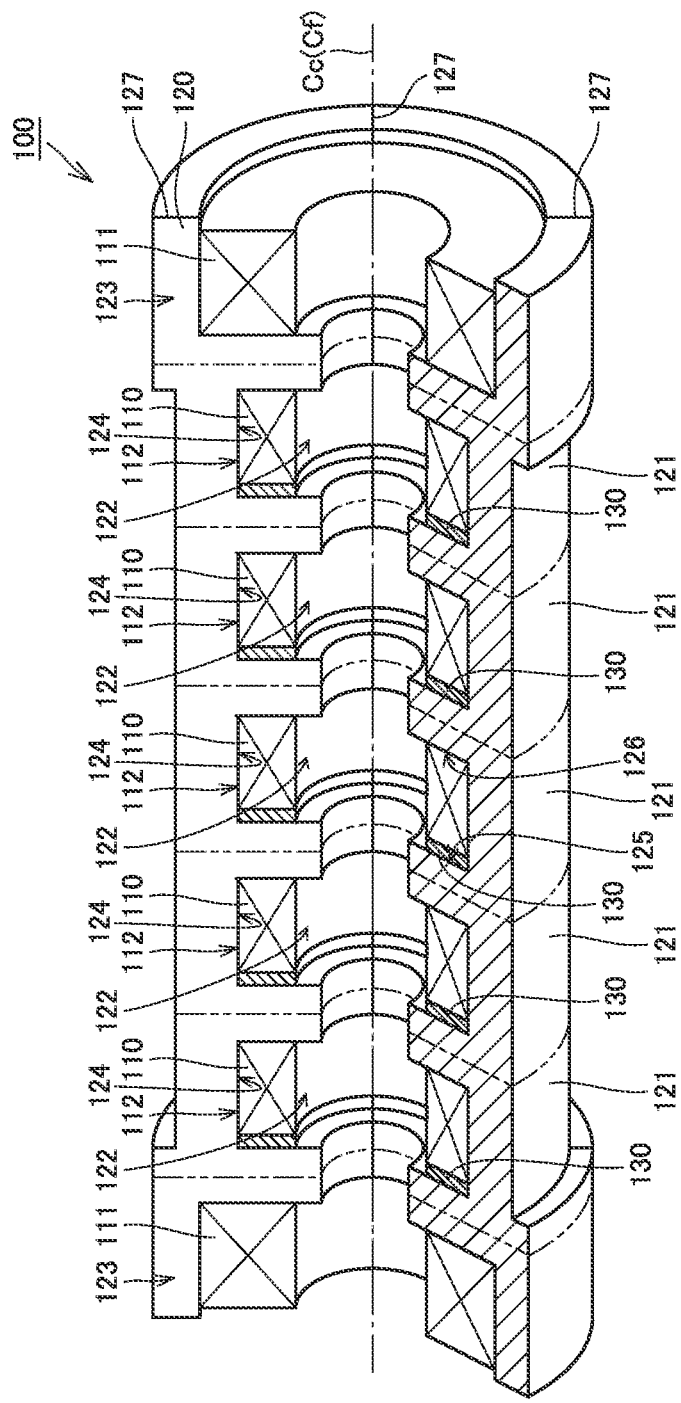
FIG. 1 is a perspective view showing a configuration of a superconducting coil according to a first embodiment of the present invention.

In the following, a superconducting coil according to each of embodiments of the present invention will be described with reference to the accompanying drawings. In the following description of each of the embodiments, the same or corresponding components in the accompanying drawings will be denoted by the same reference characters, and the description thereof will not be repeated.

First Embodiment

FIG. 1 is a perspective view showing a configuration of a superconducting coil according to a first embodiment of the present invention. FIG. 1 schematically shows the superconducting coil that is partially cut away.

As shown in FIG. 1, a superconducting coil 100 according to the first embodiment of the present invention includes a plurality of disk-shaped windings 110, an outer frame portion 120, and refrigerant (not shown).

In the present embodiment, each of the plurality of disk-shaped windings 110 and outer frame portion 120 are accommodated in a refrigerant container (not shown) while being immersed in refrigerant. In other words, the refrigerant cools the plurality of disk-shaped windings 110 and outer frame portion 120. In the present embodiment, the type of refrigerant is not particularly limited. The refrigerant is liquid helium or liquid nitrogen, for example.

Each of the plurality of disk-shaped windings 110 is configured, for example, by winding a superconducting wire formed by embedding a niobium titanium alloy in a central portion of a matrix made of copper. In the present embodiment, a winding frame is not located on the inner circumferential surface of each of the plurality of disk-shaped windings 110.

The plurality of disk-shaped windings 110 are coaxially arranged. Specifically, the central axis of the inner circumferential surface of each of the plurality of disk-shaped windings 110 is located on a winding central axis Cc. The plurality of disk-shaped windings 110 are spaced apart from each other in the direction along winding central axis Cc. The plurality of disk-shaped windings 110 are electrically connected to each other.

Superconducting coil 100 according to the first embodiment of the present invention further includes two outermost disk-shaped windings 111. Each of these two outermost disk-shaped windings 111 is configured by winding a superconducting wire similar to the superconducting wire that forms each of the plurality of disk-shaped windings 110. Each of two outermost disk-shaped windings 111 is arranged coaxially with each of the plurality of disk-shaped windings 110. These two outermost disk-shaped windings 111 are located so as to sandwich the plurality of disk-shaped windings 110 in the direction along winding central axis Cc. Each of two outermost disk-shaped windings 111 is electrically connected to the plurality of disk-shaped windings 110. Each of two outermost disk-shaped windings 111 is also accommodated in the refrigerant container while being immersed in the refrigerant.

Outer frame portion 120 fixes each of the plurality of disk-shaped windings 110. Outer frame portion 120 includes a plurality of ring-shaped fixing portions 121. Specifically, each of the plurality of ring-shaped fixing portions 121 fixes a corresponding one of the plurality of disk-shaped windings 110.

Each of the plurality of ring-shaped fixing portions 121 has a recessed groove portion 122 extending in the circumferential direction on the inner circumferential side. Also, the plurality of ring-shaped fixing portions 121 are arranged coaxially with each other. In the present embodiment, the plurality of ring-shaped fixing portions 121 are formed of a single piece member. In other words, the plurality of ring-shaped fixing portions 121 are contiguous to each other in the direction along a central axis Cf of the entirety of the plurality of ring-shaped fixing portions 121. The plurality of ring-shaped fixing portions 121 may be spaced apart from each other in the direction along central axis Cf.

Each of the plurality of disk-shaped windings 110 is inserted into recessed groove portion 122 of a corresponding one of the plurality of ring-shaped fixing portions 121. An outer circumferential surface 112 of each of the plurality of disk-shaped windings 110 is in direct or indirect contact with a bottom surface 124 of recessed groove portion 122 of a corresponding one of the plurality of ring-shaped fixing portions 121. In the present embodiment, outer circumferential surface 112 of each of the plurality of disk-shaped windings 110 is in direct contact with bottom surface 124 of recessed groove portion 122 of a corresponding one of the plurality of ring-shaped fixing portions 121.

Outer frame portion 120 further includes two outermost ring-shaped fixing portions 123. These two outermost ring-shaped fixing portions are located so as to sandwich the plurality of ring-shaped fixing portions 121 in the direction along central axis Cf. Each of two outermost ring-shaped fixing portions 123 supports a corresponding one of two outermost disk-shaped windings 111 on the inner circumferential surface side.

Outer frame portion 120 is formed by joining a plurality of members to each other in a circumferential direction around central axis Cf when viewed in the direction along central axis Cf of the entirety of the plurality of ring-shaped fixing portions 121. Thus, outer frame portion 120 has a plurality of joint surfaces 127 extending in the direction along central axis Cf. In the present embodiment, outer frame portion 120 is formed by joining four members, which have substantially the same shape, to each other in the circumferential direction around central axis Cf. In the embodiment of the present invention, the members constituting outer frame portion 120 are joined to each other with fastening members such as bolts.

In the present embodiment, outer frame portion 120 is made of aluminum for the purpose of reducing the weight of superconducting coil 100. Aluminum is higher in coefficient of thermal expansion than copper that is a main component of the material forming the plurality of disk-shaped windings 110 in the present embodiment. In the present embodiment, the material forming outer frame portion 120 is not limited to aluminum as long as it is higher in coefficient of thermal expansion than copper that is a main component of the material forming outer frame portion 120.

A first adjustment member 130 is located between one side surface 125 of recessed groove portion 122 of each of the plurality of ring-shaped fixing portions 121 and a corresponding one of the plurality of disk-shaped windings 110. In other words, superconducting coil 100 further includes a plurality of first adjustment members 130.

Each of the plurality of first adjustment members 130 is a plate-like member having an annular outer shape when viewed in the direction along winding central axis Cc. Each of the plurality of first adjustment members 130 is located coaxially with the plurality of disk-shaped windings 110 in the direction along winding central axis Cc.

In the present embodiment, each of the plurality of first adjustment members 130 is formed by joining a plurality of members in the circumferential direction around winding central axis Cc. Each of the plurality of first adjustment members 130 may be formed of a single member.

In the present embodiment, first adjustment member 130 is made of metal, for example. From the viewpoint of the coefficient of thermal expansion, first adjustment member 130 may be made of aluminum similar to the material forming outer frame portion 120, or may be made of copper that is a main component of the material forming a superconducting wire.

In the present embodiment, the other side surface 126 of recessed groove portion 122 of each of the plurality of ring-shaped fixing portions 121 is in direct contact with a corresponding one of the plurality of disk-shaped windings 110. The other side surface 126 is located opposite to one side surface 125.

The following describes a method of manufacturing superconducting coil 100 according to the first embodiment of the present invention. In the method of manufacturing superconducting coil 100 according to the first embodiment of the present invention, first, a superconducting wire is wound around a rod-shaped jig. After winding the superconducting wire around the rod-shaped jig, the superconducting wire is subjected to finishing. Thereby, the plurality of disk-shaped windings 110 as shown in FIG. 1 are formed. Then, the rod-shaped jig is removed from the plurality of disk-shaped windings 110. The rod-shaped jig is a mandrel, for example.

Figure 2:
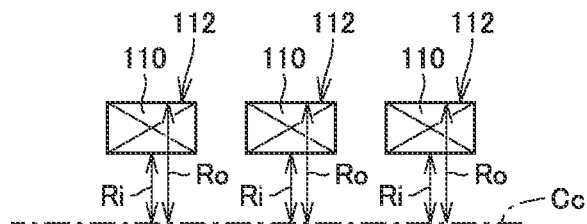
FIG. 2 is a partial cross-sectional view showing a plurality of disk-shaped windings during measurement of a distance from a winding central axis to an outer circumferential surface, in the method of manufacturing a superconducting coil according to the first embodiment of the present invention.

FIG. 2 is a partial cross-sectional view showing a plurality of disk-shaped windings during measurement of a distance from the winding central axis to the outer circumferential surface, in the method of manufacturing a superconducting coil according to the first embodiment of the present invention. FIG. 2 shows a partial cross section of the plurality of disk-shaped windings 110, which is taken along a plane including a winding central axis as will be described later.

As shown in FIG. 2, a distance Ro from winding central axis Cc as a central axis of the inner circumferential surface of each of the plurality of disk-shaped windings 110 to outer circumferential surface 112 of a corresponding one of the plurality of disk-shaped windings 110 is measured. In other words, the outer shape of each of the plurality of disk-shaped windings 110 viewed in the direction along winding central axis Cc is measured. It should be noted that the length of a distance Ri from winding central axis Cc to the inner circumferential surface of each of the plurality of disk-shaped windings 110 is the same as the length of the outer diameter of the rod-shaped jig. Thus, distances Ri from winding central axis Cc to the inner circumferential surfaces of the plurality of disk-shaped windings 110 are substantially the same among the plurality of disk-shaped windings 110.

In the method of manufacturing superconducting coil 100 according to the present embodiment, the plurality of disk-shaped windings 110 are formed, and outer frame portion 120 is formed. In the present embodiment, outer frame portion 120 may be formed before the plurality of disk-shaped windings 110 are formed, or outer frame portion 120 may be formed after the plurality of disk-shaped windings 110 are formed.

Figure 3:
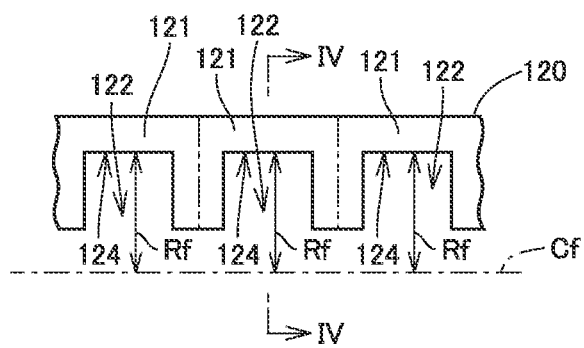
FIG. 3 is a partial cross-sectional view showing an outer frame portion during alignment of a central axis of the entirety of a plurality of ring-shaped fixing portions of the outer frame portion, in the method of manufacturing a superconducting coil according to the first embodiment of the present invention.
Figure 4:
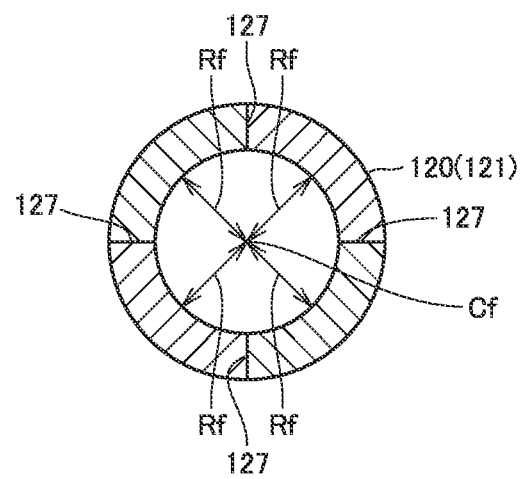
FIG. 4 is a cross-sectional view of the outer frame portion shown in FIG. 3 as viewed in a direction of an arrow along a line IV-IV.

FIG. 3 is a partial cross-sectional view showing an outer frame portion during alignment of a central axis of the entirety of a plurality of ring-shaped fixing portions of the outer frame portion, in the method of manufacturing a superconducting coil according to the first embodiment of the present invention. FIG. 4 is a cross-sectional view of the outer frame portion shown in FIG. 3 as viewed in a direction of an arrow along a line IV-IV. FIG. 3 illustrates a part of joint surface 127 of outer frame portion 120.

As shown in FIGS. 3 and 4, after outer frame portion 120 is formed, the shape of bottom surface 124 of recessed groove portion 122 of each of the plurality of ring-shaped fixing portions 121 is measured. Then, based on measurement of the shape of bottom surface 124, central axis Cf of the entirety of the plurality of ring-shaped fixing portions 121 is aligned. Specifically, alignment is performed such that the length of distance Rf from bottom surface 124 of recessed groove portion 122 of each of the plurality of ring-shaped fixing portions 121 to central axis Cf of the entirety of the plurality of ring-shaped fixing portions 121 is close to a fixed value at any point in one ring-shaped fixing portion 121. At the same time, central axis Cf of the entirety of the plurality of ring-shaped fixing portions 121 is aligned such that the lengths of distances Rf are close to each other among the plurality of ring-shaped fixing portions 121. Such alignment eliminates a need for high dimensional accuracy in formation of outer frame portion 120.

Figure 5:
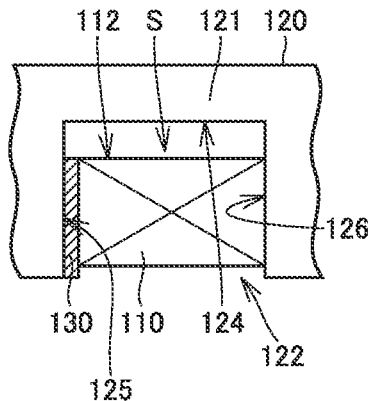
FIG. 5 is a partial cross-sectional view showing a state where one of the plurality of disk-shaped windings is inserted into a recessed groove portion of a corresponding one of the plurality of ring-shaped fixing portions, in the method of manufacturing a superconducting coil according to the first embodiment of the present invention.

FIG. 5 is a partial cross-sectional view showing a state where one of the plurality of disk-shaped windings is inserted into a recessed groove portion of a corresponding one of the plurality of ring-shaped fixing portions, in the method of manufacturing a superconducting coil according to the first embodiment of the present invention. FIG. 5 partially shows the plurality of disk-shaped windings 110 and outer frame portion 120 on a plane including a joint surface of outer frame portion 120.

As shown in FIG. 5, each of the plurality of disk-shaped windings 110 is then inserted into recessed groove portion 122 of a corresponding one of the plurality of ring-shaped fixing portions 121. In this case, each of the plurality of disk-shaped windings 110 is inserted in the state where outer circumferential surface 112 of each of the plurality of disk-shaped windings 110 is spaced apart from bottom surface 124 of recessed groove portion 122 of a corresponding one of the plurality of ring-shaped fixing portions 121 as shown in FIG. 5, based on: the result of measurement of distance Ro from winding central axis Cc to outer circumferential surface 112 of each of the plurality of disk-shaped windings 110 as shown in FIG. 2; and the result of alignment of central axis Cf of the entirety of the plurality of ring-shaped fixing portions 121 as shown in FIG. 3.

The step of inserting each of the plurality of disk-shaped windings 110 is performed at a room temperature. Further, in the step of inserting each of the plurality of disk-shaped windings 110, each of the plurality of disk-shaped windings 110 is inserted in the state where outer frame portion 120 is divided into a plurality of constituting members. After each of the plurality of disk-shaped windings 110 is inserted, the plurality of members for constituting outer frame portion 120 are joined to each other.

As shown in FIG. 5, when each of the plurality of disk-shaped windings 110 is inserted into recessed groove portion 122 of a corresponding one of the plurality of ring-shaped fixing portions 121, a gap S exists between outer circumferential surface 112 of disk-shaped winding 110 and bottom surface 124 of recessed groove portion 122. The size of gap S will be described later.

Before the plurality of disk-shaped windings 110 are inserted into respective recessed groove portions 122, the relative position of central axis Cf of the entirety of the plurality of ring-shaped fixing portions 121 with respect to winding central axis Cc is determined based on: the result of measurement of distance Ro from winding central axis Cc to outer circumferential surface 112 of each of the plurality of disk-shaped windings 110 as shown in FIG. 2; and the result of alignment of central axis Cf of the entirety of the plurality of ring-shaped fixing portions 121 as shown in FIG. 3. In this case, from the viewpoint of simplification of the method of manufacturing superconducting coil 100, it is preferable to insert the plurality of disk-shaped windings 110 into respective recessed groove portions 122 such that winding central axis Cc is aligned with central axis Cf of the entirety of the plurality of ring-shaped fixing portions 121.

In the present embodiment, as shown in FIGS. 2 and 5, the plurality of disk-shaped windings 110 are fixed at a room temperature in the direction along winding central axis Cc. In this case, the plurality of disk-shaped windings 110 are fixed by disposing first adjustment member 130 between one side surface 125 of recessed groove portion 122 of each of the plurality of ring-shaped fixing portions 121 and a corresponding one of the plurality of disk-shaped windings 110.

Then, each of the plurality of disk-shaped windings 110 and outer frame portion 120 are cooled and contracted, to thereby bring outer circumferential surface 112 of each of the plurality of disk-shaped windings 110 into direct or indirect contact with bottom surface 124 of recessed groove portion 122 of a corresponding one of the plurality of ring-shaped fixing portions 121. Specifically, after the plurality of disk-shaped windings 110 and outer frame portion 120 are accommodated in the refrigerant container, the refrigerant container is filled with refrigerant. Thereby, the plurality of disk-shaped windings 110 and outer frame portion 120 are immersed in the refrigerant.

In the present embodiment, outer frame portion 120 is higher in coefficient of thermal expansion than the plurality of disk-shaped windings 110. Thus, during the above-mentioned cooling, the contraction rate of distance Rf between bottom surface 124 and central axis Cf of the entirety of the plurality of ring-shaped fixing portions 121 as shown in FIGS. 3 and 4 is greater than the contraction rate of distance Ro from winding central axis Cc to outer circumferential surface 112 of each of the plurality of disk-shaped windings 110 as shown in FIG. 2. Thereby, as shown in FIG. 1, outer circumferential surface 112 of each of the plurality of disk-shaped windings 110 can be brought into direct or indirect contact with bottom surface 124 of recessed groove portion 122 of a corresponding one of the plurality of ring-shaped fixing portions 121. Consequently, each of the plurality of disk-shaped windings 110 can be fixed in the radial direction.

Further, in the present embodiment, the size of gap S shown in FIG. 5 is adjusted in consideration of the coefficient of thermal expansion of each of disk-shaped windings 110 and the coefficient of thermal expansion of outer frame portion 120, so as to allow suppression of thermal stress generated in each disk-shaped winding 110 by tightening of the plurality of disk-shaped windings 110 from the outer circumferential side with outer frame portion 120 when the plurality of disk-shaped windings 110 and outer frame portion 120 are cooled. Specifically, the size of gap S is adjusted such that the length of distance Ro shown in FIG. 2 and the length of distance Rf shown in FIG. 3 become substantially equal to each other due to the above-mentioned cooling. By adjusting the size of gap S in this way, outer circumferential surface 112 of each of the plurality of disk-shaped windings 110 can be brought into contact with bottom surface 124 of recessed groove portion 122 of a corresponding one of the plurality of ring-shaped fixing portions 121, and also, the pressure applied to the plurality of disk-shaped windings by outer frame portion 120 can be reduced. In other words, the above-mentioned thermal stress can be reduced.

Through the above-described steps, superconducting coil 100 according to the first embodiment of the present invention shown in FIG. 1 is manufactured.

As described above, the method of manufacturing superconducting coil 100 according to the first embodiment of the present invention includes: the step of measuring distance Ro from winding central axis Cc as the central axis of the inner circumferential surface of each of the plurality of disk-shaped windings 110 to outer circumferential surface 112 of a corresponding one of the plurality of disk-shaped windings 110; the step of measuring the shape of bottom surface 124 of recessed groove portion 122 of each of the plurality of ring-shaped fixing portions 121; the step of aligning central axis Cf of the entirety of the plurality of ring-shaped fixing portions 121 based on measurement of the shape of bottom surface 124; the step of inserting each of the plurality of disk-shaped windings 110 into recessed groove portion 122 of a corresponding one of the plurality of ring-shaped fixing portions 121; the step of fixing the plurality of disk-shaped windings 110 in the direction along winding central axis Cc; and the step of bringing outer circumferential surface 112 of each of the plurality of disk-shaped windings 110 into direct or indirect contact with bottom surface 124 of recessed groove portion 122 of a corresponding one of the plurality of ring-shaped fixing portions 121. In the step of inserting each of the plurality of disk-shaped windings 110 into recessed groove portion 122 of a corresponding one of the plurality of ring-shaped fixing portions 121, each of the plurality of disk-shaped windings 110 is inserted in the state where outer circumferential surface 112 of each of the plurality of disk-shaped windings 110 is spaced apart from bottom surface 124 of recessed groove portion 122 of a corresponding one of the plurality of ring-shaped fixing portions 121, based on: the result of measurement of distance Ro from winding central axis Cc to outer circumferential surface 112 of each of the plurality of disk-shaped windings 110; and the result of alignment of central axis Cf of the entirety of the plurality of ring-shaped fixing portions 121. In the step of fixing the plurality of disk-shaped windings 110 in the direction along winding central axis Cc, the plurality of disk-shaped windings 110 are fixed by disposing first adjustment member 130 between one side surface 125 of recessed groove portion 122 of each of the plurality of ring-shaped fixing portions 121 and a corresponding one of the plurality of disk-shaped windings 110. In the step of bringing outer circumferential surface 112 of each of the plurality of disk-shaped windings 110 into direct or indirect contact with bottom surface 124 of recessed groove portion 122 of a corresponding one of the plurality of ring-shaped fixing portions 121, each of the plurality of disk-shaped windings 110 and outer frame portion 120 are cooled and contracted for contact.

Thereby, the thermal stress can be reduced that occurs in each of the plurality of disk-shaped windings 110 due to the pressure received from each of the plurality of ring-shaped fixing portions 121 when outer frame portion 120 including the plurality of ring-shaped fixing portions 121 is cooled and contracted. Thereby, damage to superconducting coil 100 caused by deformation of the plurality of disk-shaped windings 110 can be suppressed.

Further, in superconducting coil 100 according to the first embodiment of the present invention, first adjustment member 130 is located between one side surface 125 of recessed groove portion 122 of each of the plurality of ring-shaped fixing portions 121 and a corresponding one of the plurality of disk-shaped windings 110.

Thus, when superconducting coil 100 is manufactured, outer circumferential surface 112 of each of the plurality of disk-shaped windings 110 can be kept at a distance from bottom surface 124 of recessed groove portion 122 of a corresponding one of the plurality of ring-shaped fixing portions 121. Therefore, superconducting coil 100 can be manufactured by the above-described manufacturing method, and damage to superconducting coil 100 caused by deformation of disk-shaped windings 110 can also be suppressed.

Second Embodiment

The following describes a superconducting coil according to the second embodiment of the present invention. The superconducting coil according to the second embodiment of the present invention is different from superconducting coil 100 according to the first embodiment of the present invention shown in FIG. 1 only in the configuration between bottom surface 124 of each of the plurality of ring-shaped fixing portions 121 and outer circumferential surface 112 of a corresponding one of the plurality of disk-shaped windings 110. Thus, the description of the same configurations as those of superconducting coil 100 according to the first embodiment of the present invention will not be repeated.

Figure 6:
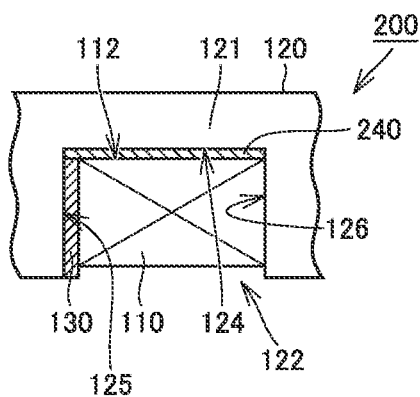
FIG. 6 is a partial cross-sectional view showing a configuration of a superconducting coil according to a second embodiment of the present invention.
Figure 7:
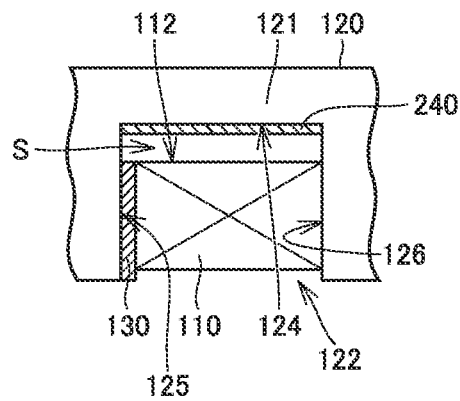
FIG. 7 is a partial cross-sectional view showing a state where one of a plurality of disk-shaped windings is inserted into a recessed groove portion of a corresponding one of a plurality of ring-shaped fixing portions, in a method of manufacturing a superconducting coil according to the second embodiment of the present invention.

FIG. 6 is a partial cross-sectional view showing a configuration of a superconducting coil according to the second embodiment of the present invention. FIG. 7 is a partial cross-sectional view showing a state where one of a plurality of disk-shaped windings is inserted into a recessed groove portion of a corresponding one of a plurality of ring-shaped fixing portions, in a method of manufacturing a superconducting coil according to the second embodiment of the present invention. FIGS. 6 and 7 each are shown in the same cross-sectional view as in FIG. 5.

As shown in FIG. 6, in a superconducting coil 200 according to the second embodiment of the present invention, a second adjustment member 240 is located between bottom surface 124 of at least one of the plurality of ring-shaped fixing portions 121 and outer circumferential surface 112 of at least one of the plurality of corresponding disk-shaped windings 110. In other words, as shown in FIG. 7, the method of manufacturing superconducting coil 200 according to the second embodiment of the present invention further includes the step of disposing second adjustment member 240 at a room temperature between bottom surface 124 of at least one of the plurality of ring-shaped fixing portions 121 and outer circumferential surface 112 of at least one of the plurality of corresponding disk-shaped windings 110.

Due to the above-described configuration, outer circumferential surface 112 can be brought into indirect contact with bottom surface 124 of recessed groove portion 122 by second adjustment member 240, when outer circumferential surface 112 cannot be brought into direct contact with bottom surface 124 even by cooling the plurality of disk-shaped windings 110 and outer frame portion 120.

In the present embodiment, second adjustment member 240 may be located between entire outer circumferential surface 112 of each of the plurality of disk-shaped windings 110 and bottom surface 124 of a corresponding one of recessed groove portions 122.

The thickness of second adjustment member 240 is adjusted as appropriate based on: the result of measurement of distance Ro from winding central axis Cc to outer circumferential surface 112 of each of the plurality of disk-shaped windings 110 as shown in FIG. 2; and the result of alignment of central axis Cf of the entirety of the plurality of ring-shaped fixing portions 121 as shown in FIGS. 3 and 4. As shown in FIG. 7, a gap S is formed between bottom surface 124 and outer circumferential surface 112 in the state where second adjustment member 240 is located therebetween. In this way, even when the length of distance Ro shown in FIG. 2 is relatively short or the difference in length between distances Rf shown in FIG. 3 is relatively long, the thickness of second adjustment member 240 shown in FIG. 7 is adjusted as appropriate, and thereby, outer circumferential surface 112 and bottom surface 124 can be brought into indirect contact with each other as shown in FIG. 6. Further, even when there is a difference in distance Rf among the plurality of outer frame portions 120 after completion of these outer frame portions 120, outer circumferential surface 112 and bottom surface 124 can be brought into indirect contact with each other by second adjustment member 240.

Second adjustment member 240 is made of metal, for example. Second adjustment member 240 may be made of stainless steel. In light of the coefficient of thermal expansion, second adjustment member 240 may be made of aluminum similar to the material forming outer frame portion 120 or made of copper as a main component of the material forming the superconducting wire.

In the second embodiment of the present invention, second adjustment member 240 may be located along the entire surface in the circumferential direction on outer circumferential surface 112 of each of the plurality of disk-shaped windings 110, or may be located along a partial surface in the circumferential direction on outer circumferential surface 112 of each of the plurality of disk-shaped windings 110.

In the second embodiment of the present invention, the length of second adjustment member 240 in the direction along winding central axis Cc is the same as the length of recessed groove portion 122. In the second embodiment of the present invention, the length of second adjustment member 240 in the direction along winding central axis Cc does not have to be the same as the length of recessed groove portion 122. The following describes a modification in the case where the length of second adjustment member 240 in the direction along winding central axis Cc is not the same as the length of recessed groove portion 122.

Figure 8:
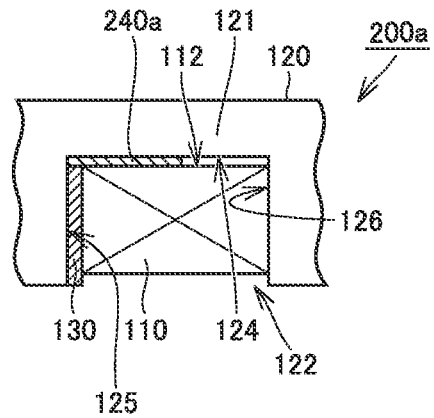
FIG. 8 is a partial cross-sectional view showing a configuration of a superconducting coil according to a first modification of the second embodiment of the present invention.
Figure 9:
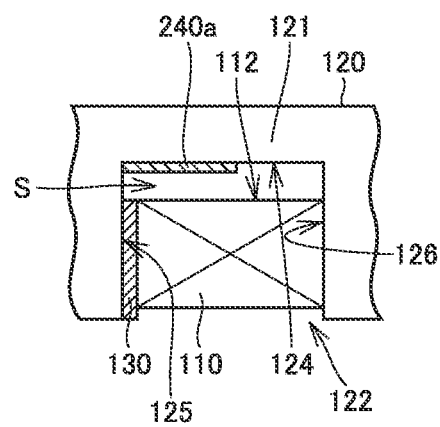
FIG. 9 is a partial cross-sectional view showing a state where one of a plurality of disk-shaped windings is inserted into a recessed groove portion of a corresponding one of a plurality of ring-shaped fixing portions, in a method of manufacturing a superconducting coil according to the first modification of the second embodiment of the present invention.

FIG. 8 is a partial cross-sectional view showing a configuration of a superconducting coil according to a first modification of the second embodiment of the present invention. FIG. 9 is a partial cross-sectional view showing a state where one of a plurality of disk-shaped windings is inserted into a recessed groove portion of a corresponding one of a plurality of ring-shaped fixing portions, in a method of manufacturing a superconducting coil according to the first modification of the second embodiment of the present invention. FIGS. 8 and 9 are shown in the same cross-sectional views as in FIGS. 6 and 7, respectively.

As shown in FIG. 8, in a superconducting coil 200a according to the second embodiment of the present invention, the length of a second adjustment member 240a in the direction along winding central axis Cc is shorter than the length of recessed groove portion 122. As shown in FIG. 9, in the method of manufacturing superconducting coil 200a according to the second embodiment of the present invention, the length of second adjustment member 240a in the direction along winding central axis Cc is shorter than the length of recessed groove portion 122 when second adjustment member 240 is disposed at a room temperature.

Third Embodiment

The following describes a superconducting coil according to the third embodiment of the present invention. The superconducting coil according to the third embodiment of the present invention is different from superconducting coil 100 according to the first embodiment of the present invention shown in FIG. 1 only in that a winding protection member is disposed in recessed groove portion 122 of each of the plurality of ring-shaped fixing portions 121. Thus, the description of the same configurations as those of superconducting coil 100 according to the first embodiment of the present invention will not be repeated.

Figure 10:
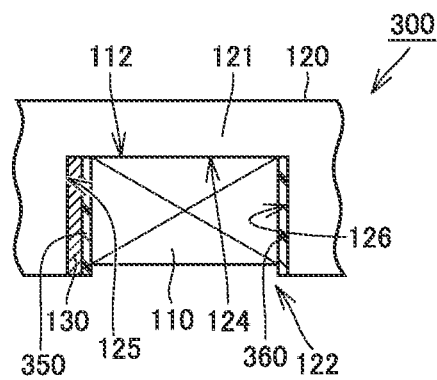
FIG. 10 is a partial cross-sectional view showing a configuration of a superconducting coil according to a third embodiment of the present invention.
Figure 11:
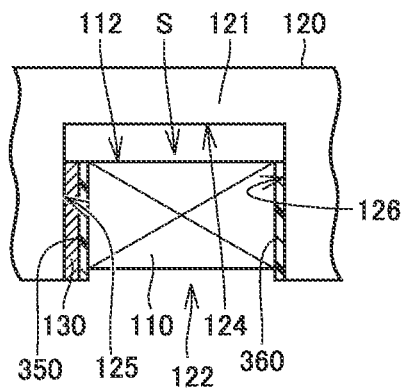
FIG. 11 is a partial cross-sectional view showing a state where one of a plurality of disk-shaped windings is inserted into a recessed groove portion of a corresponding one of a plurality of ring-shaped fixing portions, in a method of manufacturing a superconducting coil according to the third embodiment of the present invention.

FIG. 10 is a partial cross-sectional view showing a configuration of a superconducting coil according to the third embodiment of the present invention. FIG. 11 is a partial cross-sectional view showing a state where one of a plurality of disk-shaped windings is inserted into a recessed groove portion of a corresponding one of a plurality of ring-shaped fixing portions, in a method of manufacturing a superconducting coil according to the third embodiment of the present invention. FIGS. 10 and 11 each are shown in the same cross-sectional view as in FIG. 5.

As shown in FIG. 10, in a superconducting coil 300 according to the third embodiment of the present invention, a first winding protection member 350 is located between first adjustment member 130 and each of the plurality of disk-shaped windings 110. Further, a second winding protection member 360 is located between each of the plurality of disk-shaped windings 110 and the other side surface 126 of recessed groove portion 122 of a corresponding one of the plurality of ring-shaped fixing portions 121. The other side surface 126 is located opposite to one side surface 125. In other words, as shown in FIG. 11, in the method of manufacturing superconducting coil 300 according to the third embodiment of the present invention, first winding protection member 350 is disposed at a room temperature between first adjustment member 130 and each of the plurality of disk-shaped windings 110. Also, second winding protection member 360 is disposed between each of the plurality of disk-shaped windings 110 and the other side surface 126 of recessed groove portion 122 of a corresponding one of the plurality of ring-shaped fixing portions 121, the other side surface 126 being located opposite to one side surface 125.

In the third embodiment of the present invention, disposing first winding protection member 350 and second winding protection member 360 as described above can suppress damage to each of the plurality of disk-shaped windings 110 caused by friction against other members when outer frame portion 120 is contracted by cooling more greatly than the plurality of disk-shaped windings 110.

As shown in FIG. 10, each of first winding protection member 350 and second winding protection member 360 is made, for example, of an insulating material, and specifically made of glass epoxy. Further, each of first winding protection member 350 and second winding protection member 360 has an annular outer shape along the plurality of disk-shaped windings 110 when viewed in the direction along winding central axis Cc.

As shown in FIG. 11, when first winding protection member 350 and second winding protection member 360 are disposed, first winding protection member 350 and second winding protection member 360 each are spaced apart from bottom surface 124 of recessed groove portion 122 in a corresponding one of the plurality of ring-shaped fixing portions 121. Specifically, first winding protection member 350 and second winding protection member 360 are disposed such that their outer circumferential surfaces are located flush with outer circumferential surface 112 of a corresponding disk-shaped winding 110 among the plurality of disk-shaped windings 110.

Fourth Embodiment

The following describes a method of manufacturing a superconducting coil according to the fourth embodiment of the present invention. The method of manufacturing a superconducting coil according to the fourth embodiment of the present invention is different from the method of manufacturing superconducting coil 100 according to the first embodiment of the present invention mainly in the order of steps. Thus, the description of the same configurations as those of the method of manufacturing superconducting coil 100 according to the first embodiment of the present invention will not be repeated. The superconducting coil manufactured by the method of manufacturing a superconducting coil according to the fourth embodiment of the present invention has the same configuration as that of superconducting coil 100 according to the first embodiment of the present invention.

Figure 12:
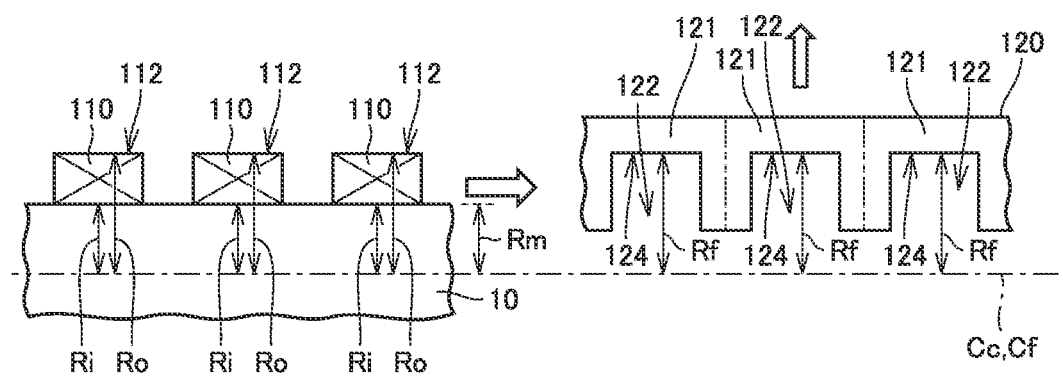
FIG. 12 is a diagram showing a relative positional relation between: a plurality of disk-shaped windings during measurement of a distance from a winding central axis to an outer circumferential surface; and an outer frame portion during alignment of a central axis of the entirety of a plurality of ring-shaped fixing portions, in a method of manufacturing a superconducting coil according to a fourth embodiment of the present invention.

FIG. 12 is a diagram showing a relative positional relation between: a plurality of disk-shaped windings during measurement of a distance from a winding central axis to an outer circumferential surface; and an outer frame portion during alignment of a central axis of the entirety of a plurality of ring-shaped fixing portions, in a method of manufacturing a superconducting coil according to a fourth embodiment of the present invention. FIG. 12 is shown in the same cross-sectional view as in FIGS. 2 and 3.

As shown in FIG. 12, in the fourth embodiment of the present invention, the plurality of disk-shaped windings 110 are configured in the state where a superconducting wire is wound around a rod-shaped jig 10 when the distance from winding central axis Cc to outer circumferential surface 112 is measured.

In the present embodiment, rod-shaped jig 10 has a circular outer shape through which winding central axis Cc extends as a central axis when viewed in the direction along winding central axis Cc. The length of an outer diameter Rm when viewing rod-shaped jig 10 in the direction along winding central axis Cc can be changed as appropriate.

Rod-shaped jig 10 is configured to be conveyable such that central axis Cf of the entirety of the plurality of ring-shaped fixing portions 121 is located on a trajectory drawn by the central axis of rod-shaped jig 10 during conveyance of rod-shaped jig 10. In other words, in the fourth embodiment of the present invention, central axis Cf of the entirety of the plurality of ring-shaped fixing portions 121 is located on the trajectory along which winding central axis Cc can move. In the fourth embodiment of the present invention, central axis Cf is aligned by adjusting the relative position of outer frame portion 120 with respect to central axis Cf of the entirety of the plurality of ring-shaped fixing portions 121 that are fixed.

As shown in FIG. 12, when distance Ro from winding central axis Cc to outer circumferential surface 112 is measured, outer diameter Rm of rod-shaped jig 10 is the same as distance Ri from winding central axis Cc to the inner circumferential surface of each of the plurality of disk-shaped windings 110.

Figure 13:
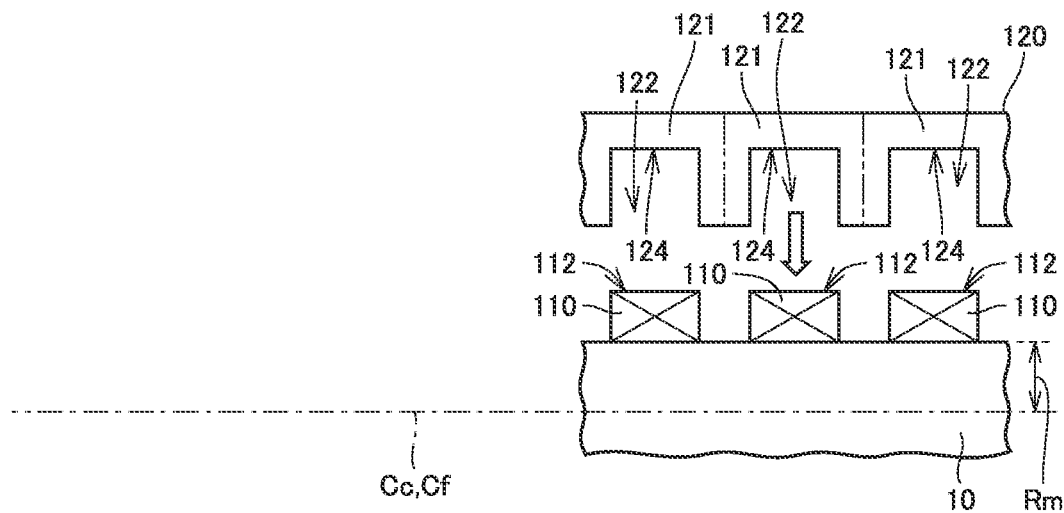
FIG. 13 is a diagram showing a state immediately before the plurality of disk-shaped windings are inserted into respective recessed groove portions, in the method of manufacturing a superconducting coil according to the fourth embodiment of the present invention.

FIG. 13 is a diagram showing a state immediately before the plurality of disk-shaped windings are inserted into respective recessed groove portions, in the method of manufacturing a superconducting coil according to the fourth embodiment of the present invention.

As shown in FIG. 13, immediately before the plurality of disk-shaped windings 110 are inserted into respective recessed groove portions 122 after measurement of distance Ro and alignment of central axis Cf, outer frame portion 120 is divided into a plurality of members, which constitute outer frame portion 120, in the state where the position of central axis Cf of the entirety of the plurality of ring-shaped fixing portions 121 is defined. On the other hand, the plurality of disk-shaped windings 110 are conveyed together with rod-shaped jig 10 in the state where a superconducting wire is wound around rod-shaped jig 10. Specifically, the plurality of disk-shaped windings 110 and rod-shaped jig 10 are conveyed to a region surrounded by a plurality of members constituting outer frame portion 120 that is in a divided state.

Figure 14:
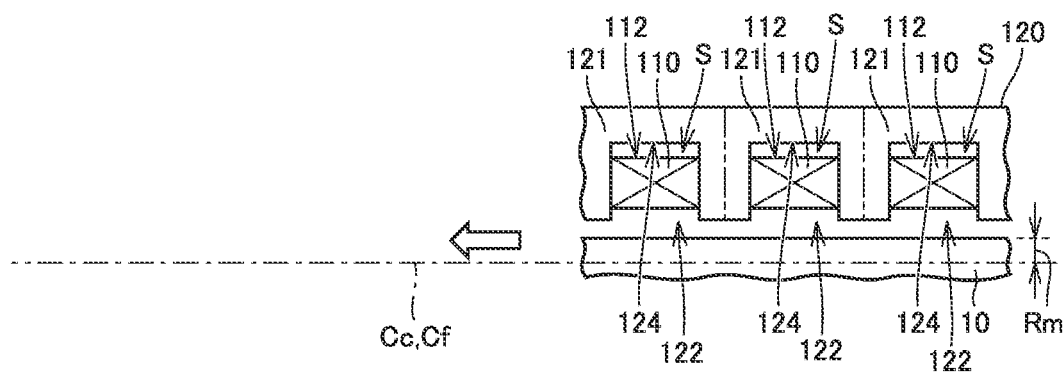
FIG. 14 is a diagram showing a state immediately after the plurality of disk-shaped windings are inserted into respective recessed groove portions, in the method of manufacturing a superconducting coil according to the fourth embodiment of the present invention.

FIG. 14 is a diagram showing a state immediately after the plurality of disk-shaped windings are inserted into respective recessed groove portions, in the method of manufacturing a superconducting coil according to the fourth embodiment of the present invention.

As shown in FIG. 14, after conveyance of the plurality of disk-shaped windings 110 and rod-shaped jig 10, each of the plurality of disk-shaped windings 110 is inserted into recessed groove portion 122 of a corresponding one of the plurality of ring-shaped fixing portions 121. Then, rod-shaped jig 10 is removed from the plurality of disk-shaped windings 110.

When each of the plurality of disk-shaped windings 110 is inserted into recessed groove portion 122 of a corresponding one of the plurality of ring-shaped fixing portions 121, rod-shaped jig 10 is reduced in outer diameter Rm so as not to contact outer frame portion 120 or while contacting outer frame portion 120.

As described above, in the method of manufacturing a superconducting coil according to the fourth embodiment of the present invention, the step of inserting each of the plurality of disk-shaped windings 110 into recessed groove portion 122 of a corresponding one of the plurality of ring-shaped fixing portions 121 is followed by the step of removing rod-shaped jig 10 from the plurality of disk-shaped windings 110. Thereby, winding central axis Cc of disk-shaped windings 110 can be readily aligned with central axis Cf of the entirety of the plurality of ring-shaped fixing portions 121.

In the description of the embodiments described above, configurations that can be combined may be combined with each other.

The above embodiments disclosed herein are illustrative in any respects and should not be construed as being restrictive. Therefore, the technical scope of the present invention is not interpreted only in view of the above-described embodiments, but is defined by the terms of the claims, and also, is intended to include any modifications within the meaning and scope equivalent to the terms of the claims.

REFERENCE SIGNS LIST 10 rod-shaped jig, 100, 200, 200a, 300 superconducting coil, 110 disk-shaped winding, 111 outermost disk-shaped winding, 112 outer circumferential surface, 120 outer frame portion, 121 ring-shaped fixing portion, 122 recessed groove portion, 123 outermost ring-shaped fixing portion, 124 bottom surface, 125 one side surface, 126 the other side surface, 127 joint surface, 130 first adjustment member, 240, 240*a* second adjustment member, 350 first winding protection member, 360 second winding protection member.

The invention claimed is:

1. A method of manufacturing a superconducting coil, the method comprising:
    winding a superconducting wire around a rod-shaped jig to form a plurality of disk-shaped windings to be coaxially arranged;
    removing the rod-shaped jig from the disk-shaped windings;
    measuring a distance from a winding central axis to an outer circumferential surface of each of the disk-shaped windings, the winding central axis being a central axis of an inner circumferential surface of each of the disk-shaped windings;
    forming an outer frame portion including a plurality of ring-shaped fixing portions that each have a recessed groove portion extending in a circumferential direction on an inner circumferential side, the ring-shaped fixing portions being coaxially arranged;
    measuring a shape of a bottom surface of the recessed groove portion of each of the ring-shaped fixing portions;
    aligning a central axis of an entirety of the ring-shaped fixing portions based on measurement of the shape of the bottom surface;
    inserting each of the disk-shaped windings into the recessed groove portion of a corresponding one of the ring-shaped fixing portions in a state where the outer circumferential surface of each of the disk-shaped windings is spaced apart from the bottom surface of the recessed groove portion of the corresponding one of the ring-shaped fixing portions, based on a result of measurement of a distance from the winding central axis to the outer circumferential surface of each of the disk-shaped windings, and a result of alignment of the central axis of the entirety of the ring-shaped fixing portions;
    fixing the disk-shaped windings in a direction along the winding central axis by disposing a first adjustment member between one side surface of the recessed groove portion of each of the ring-shaped fixing portions and a corresponding one of the disk-shaped windings; and
    by cooling and contracting each of the disk-shaped windings and the outer frame portion, bringing the outer circumferential surface of each of the disk-shaped windings into direct or indirect contact with the bottom surface of the recessed groove portion of the corresponding one of the ring-shaped fixing portions.

2. The method of manufacturing a superconducting coil according to claim 1, further comprising disposing a second adjustment member between the bottom surface of at least one of the ring-shaped fixing portions and the outer circumferential surface of at least one of corresponding ones of the disk-shaped windings.

3. The method of manufacturing a superconducting coil according to claim 1, further comprising disposing a first winding protection member between the first adjustment member and each of the disk-shaped windings, and disposing a second winding protection member between each of the disk-shaped windings and the other side surface of the recessed groove portion of the corresponding one of the ring-shaped fixing portions, the other side surface being located opposite to the one side surface.

4. The method of manufacturing a superconducting coil according to claim 1, comprising, after the inserting each of the disk-shaped windings into the recessed groove portion of the corresponding one of the ring-shaped fixing portions, removing the rod-shaped jig from the disk-shaped windings.

5. A superconducting coil comprising:
    a plurality of disk-shaped windings that are coaxially arranged;
    an outer frame portion that fixes each of the disk-shaped windings; and
    refrigerant that cools the disk-shaped windings and the outer frame portion, wherein
    the outer frame portion includes a plurality of ring-shaped fixing portions that each have a recessed groove portion extending in a circumferential direction on an inner circumferential side, the ring-shaped fixing portions being coaxially arranged,
    each of the disk-shaped windings is inserted into the recessed groove portion of a corresponding one of the ring-shaped fixing portions,
    an outer circumferential surface of each of the disk-shaped windings is in direct or indirect contact with a bottom surface of the recessed groove portion of the corresponding one of the ring-shaped fixing portions, and
    a first adjustment member is located between one side surface of the recessed groove portion of each of the ring-shaped fixing portions and a corresponding one of the disk-shaped windings.

6. The superconducting coil according to claim 5, wherein a second adjustment member is located between the bottom surface of at least one of the ring-shaped fixing portions and the outer circumferential surface of at least one of corresponding ones of the disk-shaped windings.

7. The superconducting coil according to claim 5, wherein a first winding protection member is located between the first adjustment member and each of the disk-shaped windings, and
    a second winding protection member is located between each of the disk-shaped windings and the other side surface of the recessed groove portion of the corresponding one of the ring-shaped fixing portions, the other side surface being located opposite to the one side surface.

8. The method of manufacturing a superconducting coil according to claim 2, further comprising disposing a first winding protection member between the first adjustment member and each of the disk-shaped windings, and disposing a second winding protection member between each of the disk-shaped windings and the other side surface of the recessed groove portion of the corresponding one of the ring-shaped fixing portions, the other side surface being located opposite to the one side surface.

9. The method of manufacturing a superconducting coil according to claim 2, comprising, after the inserting each of the disk-shaped windings into the recessed groove portion of the corresponding one of the ring-shaped fixing portions, removing the rod-shaped jig from the disk-shaped windings.

10. The method of manufacturing a superconducting coil according to claim 3, comprising, after the inserting each of the disk-shaped windings into the recessed groove portion of the corresponding one of the ring-shaped fixing portions, removing the rod-shaped jig from the disk-shaped windings.

11. The superconducting coil according to claim 6, wherein
- a first winding protection member is located between the first adjustment member and each of the disk-shaped windings, and
- a second winding protection member is located between each of the disk-shaped windings and the other side surface of the recessed groove portion of the corresponding one of the ring-shaped fixing portions, the other side surface being located opposite to the one side surface.

* * * * *